(12) United States Patent
Ha

(10) Patent No.: US 11,257,208 B2
(45) Date of Patent: Feb. 22, 2022

(54) DEFECT INSPECTION SYSTEM FOR SPECIMEN AND DEFECT INSPECTION METHOD FOR SPECIMEN

(71) Applicant: Samsung Display Co., Ltd., Yongin-si (KR)

(72) Inventor: Seong-keun Ha, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 169 days.

(21) Appl. No.: 16/553,920

(22) Filed: Aug. 28, 2019

(65) Prior Publication Data
US 2020/0151862 A1 May 14, 2020

(30) Foreign Application Priority Data

Nov. 13, 2018 (KR) .......................... 10-2018-0138795

(51) Int. Cl.
*G06T 7/00* (2017.01)
*G06T 3/40* (2006.01)

(52) U.S. Cl.
CPC ................ *G06T 7/001* (2013.01); *G06T 3/40* (2013.01); *G06T 2207/20021* (2013.01); *G06T 2207/30108* (2013.01)

(58) Field of Classification Search
CPC . G06T 2207/20021; G06T 2207/30108; G06T 3/40; G06T 3/403; G06T 7/001
See application file for complete search history.

(56) References Cited

U.S. PATENT DOCUMENTS

| 2009/0185179 | A1* | 7/2009 | Hill ...................... G01N 21/958 356/239.1 |
| 2011/0129164 | A1* | 6/2011 | Lin .......................... G06T 3/40 382/254 |
| 2012/0098959 | A1* | 4/2012 | Addington ........... G01N 21/958 348/125 |

(Continued)

FOREIGN PATENT DOCUMENTS

| KR | 10-2015-0071228 A | 6/2015 |
| KR | 10-2016-0083765 A | 7/2016 |

(Continued)

OTHER PUBLICATIONS

Jian, Chuanxia, Jian Gao, and Yinhui Ao. "Automatic surface defect detection for mobile phone screen glass based on machine vision." Applied Soft Computing 52 (2017): 348-358. (Year: 2017).*

*Primary Examiner* — Bobbak Safaipour
(74) *Attorney, Agent, or Firm* — Lewis Roca Rothgerber Christie LLP

(57) ABSTRACT

A defect inspection system for a specimen includes an image sensor and a defect inspection device. The image sensor is configured to capture a target image of the specimen that includes a flat portion and a curved portion extending from the flat portion along a first direction and having a curvature. The target image includes a first area corresponding to the flat portion of the specimen and a second area corresponding to the curved portion of the specimen. The defect inspection device is configured to determine a defect of the specimen based on the target image. The defect inspection device includes an image editor that is configured to enlarge a width of the second area along the first direction by a resize ratio.

20 Claims, 12 Drawing Sheets

(56) References Cited

U.S. PATENT DOCUMENTS

| | | | | |
|---|---|---|---|---|
| 2017/0121210 A1* | 5/2017 | Rai | .................... | C03B 23/0357 |
| 2017/0274626 A1* | 9/2017 | Ukrainczyk | ........ | C03B 23/0355 |
| 2018/0103214 A1* | 4/2018 | Ise | .......................... | H04N 5/77 |
| 2018/0213134 A1* | 7/2018 | Wu | ................... | G01N 21/8851 |
| 2019/0011374 A1* | 1/2019 | Onishi | ..................... | G06T 7/00 |
| 2019/0380456 A1* | 12/2019 | Granito | ................. | A44C 5/246 |

FOREIGN PATENT DOCUMENTS

| | | |
|---|---|---|
| KR | 10-1775458 B1 | 9/2017 |
| KR | 10-1854401 B1 | 5/2018 |
| KR | 10-1867015 B1 | 6/2018 |

\* cited by examiner

DEFECT INSPECTION SYSTEM FOR SPECIMEN AND DEFECT INSPECTION METHOD FOR SPECIMEN

CROSS-REFERENCE TO RELATED APPLICATION

This application claims priority to and the benefit of Korean Patent Application No. 10-2018-0138795, filed on Nov. 13, 2018, the contents of which are hereby incorporated by reference in their entirety.

BACKGROUND

1. Field

The present disclosure relates to a defect inspection system for a specimen and a method of inspecting a specimen for defects.

2. Description of the Related Art

A display device may be used as a display for a mobile device, such as a smart phone, a digital camera, a camcorder, a mobile terminal, a laptop computer, and a tablet personal computer, or may be applied to electrical and electronic products, such as a television. The display device may have a constant curvature in its edge area (or periphery) by taking into account the effect on user convenience, such as a user's grip and an ease of portability, and also may provide improved aesthetics. Accordingly, an edge area (or peripheral area) of the cover glass of the display device has a constant curvature as well.

The cover glass is easily recognized by a user who uses the display device. A defect in the cover glass is one of the defects in the display device that is most easily found by the user.

The defect in the cover glass is detected by an automated defect inspection system, and there is a method of analyzing the defect using an image obtained by photographing the cover glass.

The Background section of the present specification includes information that is intended to provide context to example embodiments, and the information in the present Background section does not necessarily constitute prior art.

SUMMARY

Embodiments of the present disclosure provide a defect inspection system and a defect inspection method that are capable of detecting a defect in a specimen, such as a cover glass.

The present disclosure provides a defect inspection system and a defect inspection method that are capable of easily detecting a defect in a curved portion of a specimen by one photographing operation (or image capture operation).

Embodiments of the present disclosure provide a defect inspection system for a specimen including an image sensor and a defect inspection device. The image sensor is configured to capture a target image of the specimen. The specimen includes a flat portion and a curved portion extending from the flat portion along a first direction and having a curvature. The target image includes a first area corresponding to the flat portion of the specimen and a second area corresponding to the curved portion of the specimen. The defect inspection device is configured to determine a defect of the specimen based on the target image. The defect inspection device includes an image editor configured to enlarge a width of the second area along the first direction by a resize ratio.

The image editor may be configured to separate the first area from the second area, generate a resized area by enlarging the width of the second area, and combine the first area with the resized area to generate an inspection image.

The defect inspection device may further include a defect detector configured to detect a defect area from the inspection image and a defect discriminator configured to compare a size of the defect area with a reference range to determine whether the specimen is normal.

The defect detector may be configured to divide the inspection image into a plurality of areas based on a difference in information between pixels adjacent to each other in the inspection image and to select the defect area from the plurality of areas.

The defect discriminator may be configured to determine that the specimen is abnormal when the size of the defect area is larger than the reference range.

The resize ratio may be based on an angle between a third direction substantially orthogonal to the flat portion and a fourth direction substantially orthogonal to a tangent plane of the curved portion. The resize ratio may be a secant value of the angle.

The resize ratio may include a first ratio based on a first angle between a third direction substantially orthogonal to the flat portion and a fourth direction substantially orthogonal to a first tangent plane at a first point of the curved portion and a second ratio based on a second angle between the third direction and a fifth direction substantially orthogonal to a second tangent plane at a second point of the curved portion. The image editor may enlarge the width of the second area by the first ratio to generate a first inspection image and may enlarge the width of the second area by the second ratio to generate a second inspection image.

The defect inspection device may further include a defect detector configured to detect a first defect area from the first inspection image and a second defect area from the second inspection image and a defect discriminator configured to determine that the specimen is abnormal when a size of the first defect area is larger than a reference range or when a size of the second defect area is larger than the reference range.

The curved portion may include a first portion extending in a first direction from the flat portion and a second portion extending in a second direction from the flat portion, the second direction crossing the first direction, and the second area may include a first curved area corresponding to the first portion and a second curved area corresponding to the second portion. The image editor may enlarge a width of the first curved area corresponding to the first direction and may enlarge a width of the second curved area corresponding to the second direction.

The curved portion may further include a third portion extending in the second direction from the first portion and extending in the first direction from the second portion. The second area may further include a third curved area corresponding to the third portion. The image editor may enlarge a width of the third curved area corresponding to the first direction and a width of the third curved area corresponding to the second direction.

Embodiments of the present disclosure provide a method of inspecting a specimen for a defect. The method includes capturing a target image of the specimen. The specimen includes a flat portion and a curved portion extending in a first direction from the flat portion and having a curvature with respect to a second direction crossing the first direction. The method further includes extracting a first area corresponding to the flat portion and a second area corresponding to the curved portion from the target image, enlarging a width of the second area corresponding to the first direction to generate an inspection image, and determining whether the specimen is normal based on the inspection image.

The generating of the inspection image may include enlarging the width of the second area by a resize ratio to generate a resized area and combining the first area with the resized area.

The resize ratio may be a secant value of an angle between a third direction substantially orthogonal to the flat portion and a fourth direction substantially orthogonal to a tangent plane of the curved portion.

The determining whether the specimen is normal may include detecting a defect area from the inspection image and comparing a size of the defect area with a reference range to determine a defect of the specimen.

When at least a portion of the defect area exists in the second area, the defect area in the second area may be enlarged in the first direction in the generating of the inspection image.

The generating of the inspection image may include enlarging the width of the second area by a first ratio to generate a first resized area, combining the first area with the first resized area to generate a first inspection image, enlarging the width of the second area by a second ratio different from the first ratio to generate a second resized area, and combining the first area with the second resized area to generate a second inspection image.

The determining whether the specimen is normal may include detecting a first defect area from the first inspection image, detecting a second defect area from the second inspection image, and determining that the specimen is abnormal when a size of the first defect area is larger than a reference range or when a size of the second defect area is larger than the reference range.

The determining whether the specimen is normal may include detecting a first defect area from the first inspection image, detecting a second defect area from the second inspection image, and determining that the specimen is normal when a size of the first defect area is smaller than a reference range and a size of the second defect area is smaller than the reference range.

The specimen may include a cover glass on a display panel.

According to the above, a defect may be determined by taking into account the size of the defect that is distorted when the curved portion of the specimen is photographed (e.g., when an image of the specimen is captured). Therefore, a defect detection reliability for the specimen may be improved. In addition, a defect inspection operation may be performed by one photographing operation (or image capture operation), and a calculation operation that compensates for the distortion of the curved portion may be simplified, thereby quickly determining whether the specimen includes a defect.

BRIEF DESCRIPTION OF THE DRAWINGS

The above and other aspects of the present disclosure will become readily apparent by reference to the following detailed description when considered in conjunction with the accompanying drawings, wherein.

DETAILED DESCRIPTION

Figure 1:
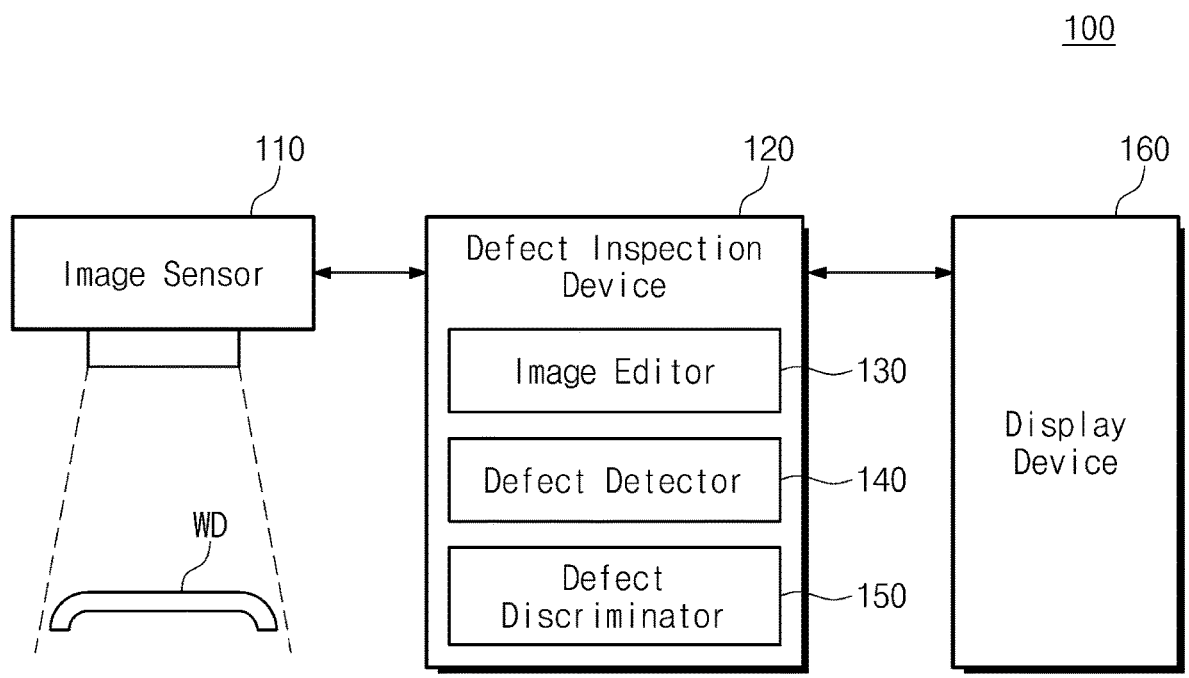
FIG. 1 is a schematic view showing a defect inspection system for a specimen according to an example embodiment of the present disclosure.

The present disclosure may be variously modified and realized in many different forms, and thus specific embodiments are exemplified in the drawings and described herein. However, the present disclosure should not be limited to the specific disclosed forms, and should be construed to include all modifications, equivalents, or replacements included in the spirit and scope of the present disclosure. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

It will be understood that when an element or layer is referred to as being "on," "connected to," or "coupled to" another element or layer, it can be directly on, connected to, or coupled to the other element or layer, or one or more intervening elements or layers may be present.

It will be further understood that the terms "comprises," "comprising," "includes" and "including", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, embodiments of the present disclosure are explained with reference to the accompanying drawings.

FIG. 1 is a schematic view showing a defect inspection system 100 for a specimen WD according to an example embodiment of the present disclosure. The defect inspection system 100 is configured to detect a defect of (or in or on) the specimen WD and is configured to determine whether the specimen WD is normal or abnormal. For example, the defect may be a scratch. Referring to FIG. 1, the defect inspection system 100 includes an image sensor 110, a defect inspection device 120, and a display device 160.

In the present example embodiment, the specimen WD may be a cover member (e.g., a cover) that protects a display panel when the display device 160 is manufactured. The cover member may prevent the display panel from being damaged due to factors, such as a fingerprint by touch, a scratch, moisture, dust, or an external impact, or may reduce the likelihood of damage to the display panel. For example, the specimen WD may include a transparent or semi-transparent glass material, however, the present disclosure should not be limited thereto or thereby. For example, the specimen WD may include a polymer material, such as polyimide (PI), polycarbonate (PC), polyethersulfone (PES), or polyethylene terephthalate (PET).

The specimen WD may include a flat portion and a curved portion. The curved portion extends from the flat portion. The curved portion may have a curvature and may be curved. The curved portion may define an edge area (e.g., a periphery) of the specimen WD. FIG. 1 shows a side surface of the specimen WD.

The image sensor 110 captures an image of the specimen WD (e.g., photographs the specimen WD). The image sensor 110 may capture an image of the specimen WD (e.g., photograph a front surface of the specimen WD), which corresponds to a display surface when the specimen WD is on (or disposed on) the display panel. The image sensor 110 may obtain (or capture) a target image, e.g., by photographing the specimen WD. The target image may include an image corresponding to the flat portion of the specimen WD and an image corresponding to the curved portion of the specimen WD.

The image sensor 110 includes a plurality of image pixels arranged in an array form. Each of the image pixels senses a light of a band (e.g., a specific band). The specific band may be a visible light band, however it should not be limited thereto or thereby. The sensed light may be converted into an analog electrical signal, and the analog electrical signal may be converted into a digital signal. The target image corresponding to the image pixels may be generated based on the digital signal. The target image may include pixel information corresponding to the image pixels, respectively.

The defect inspection device 120 is configured to determine the presence of a defect of the specimen WD based on the target image. For example, the defect inspection device 120 receives the target image from the image sensor 110. The defect inspection device 120 may include an image editor 130, a defect detector 140, and a defect discriminator 150.

The image editor 130 resizes the received target image to generate an inspection image. When the image sensor 110 captures an image of the specimen WD (e.g., photographs the specimen WD), the image of the flat portion has a shape similar to the actual one (e.g., has a shape that is similar to the shape of the flat portion of the specimen WD), but the image of the curved portion is distorted and has a different shape from the actual one (e.g., has a shape that is different from the shape of the curved portion of the specimen WD) because the captured (or photographed) image is spatially two-dimensional. A defect in the curved portion of the image may appear smaller than an actual size of the defect. The image editor 130 corrects the image corresponding to the curved portion, and thus a reliability of the defect detection may be improved.

The image editor 130 enlarges the image corresponding to the curved portion of the target image. When a user views the specimen WD in a direction (e.g., a direction substantially orthogonal or vertical to a tangent plane of the curved portion) that is different from the photographed direction of the image sensor 110, the user may perceive a size of the defect to be larger than a size of the defect appearing in the target image. For example, the image editor 130 may enlarge the image corresponding to the curved portion by a specified ratio by taking into account the size of the defect viewed in another direction.

For example, the image editor 130 may not enlarge the image in the same way that the curved portion stretches. Because a user's eyes may recognize a three-dimensional space as two-dimensional space in a similar way as the image sensor 110, the enlargement of the image, such as, stretching the curved portion, is not required in terms of visibility of the defect. Accordingly, the image editor 130 may uniformly enlarge the image by a ratio (or by a predetermined ratio or by a predetermined number of ratios). For example, an amount of calculation may be reduced compared with that of the image enlargement, such as, stretching the curved portion, by considering the curvature.

The image editor 130 may detect and separate the image corresponding to the flat portion and the image corresponding to the curved portion to enlarge the image corresponding to the curved portion. For example, the image editor 130 may detect and separate the image corresponding to the curved portion under the assumption that the size and location of the specimen WD are not changed and a specific area of the target image is the image corresponding to the curved portion. For example, the image editor 130 may detect and separate the image corresponding to the curved portion based on a difference in brightness, color, and/or saturation of the images between the flat portion and the curved portion, which is caused by a depth difference between the flat portion and the curved portion. Then, the image editor 130 may enlarge the image corresponding to the curved portion and may combine the enlarged image with the image corresponding to the flat portion, thereby generating the inspection image.

The defect detector 140 analyzes the inspection image generated by the image editor 130 and detects a defect area of the specimen WD in which the defect exists. For example, the defect detector 140 may detect the defect area by a connected-pixel detection manner (BLOB method). For example, the defect detector 140 may divide the inspection image into a plurality of areas based on a difference in pixel information adjacent to each other among pixel information included in the inspection image. The pixel information may be information obtained by digitizing brightness, color, and/or saturation. The defect detector 140 may group the areas having the same digitized information and having a difference smaller than a reference value with each other.

The defect detector 140 may select at least one defect area among the grouped areas. The defect may differ in properties, such as brightness, color, and/or saturation, compared with surrounding areas, and the defect area may be determined based on the difference. For example, pixel information or pattern in accordance with the type of defect may be recorded in advance, and the defect detector 140 may detect at least one defect area among the areas based on the record.

The defect discriminator 150 may determine whether the specimen WD includes the defect based on the defect area detected by the defect detector 140. The defect discriminator 150 compares the size of the defect area with a reference range to determine whether the specimen WD is normal or abnormal. In the present example embodiment, the reference range may be set based on a minimum defect size that allows the specimen WD to be applicable to the display device. When the size of the defect area is greater than the reference range (or equal to or greater than the reference range), the specimen WD may be determined to be normal. When the size of the defect area is equal to or smaller than the reference range (or smaller than the reference range), the specimen WD may be determined to be abnormal.

The display device 160 may display an image allowing the user of the defect inspection system 100 to recognize the inspection result. The image may be the target image generated by the image sensor 110 or the inspection image generated by the defect inspection device 120, however, it should not be limited thereto or thereby. For example, the display device 160 may display the defect area or may display whether the specimen WD is normal or not.

Figure 2:
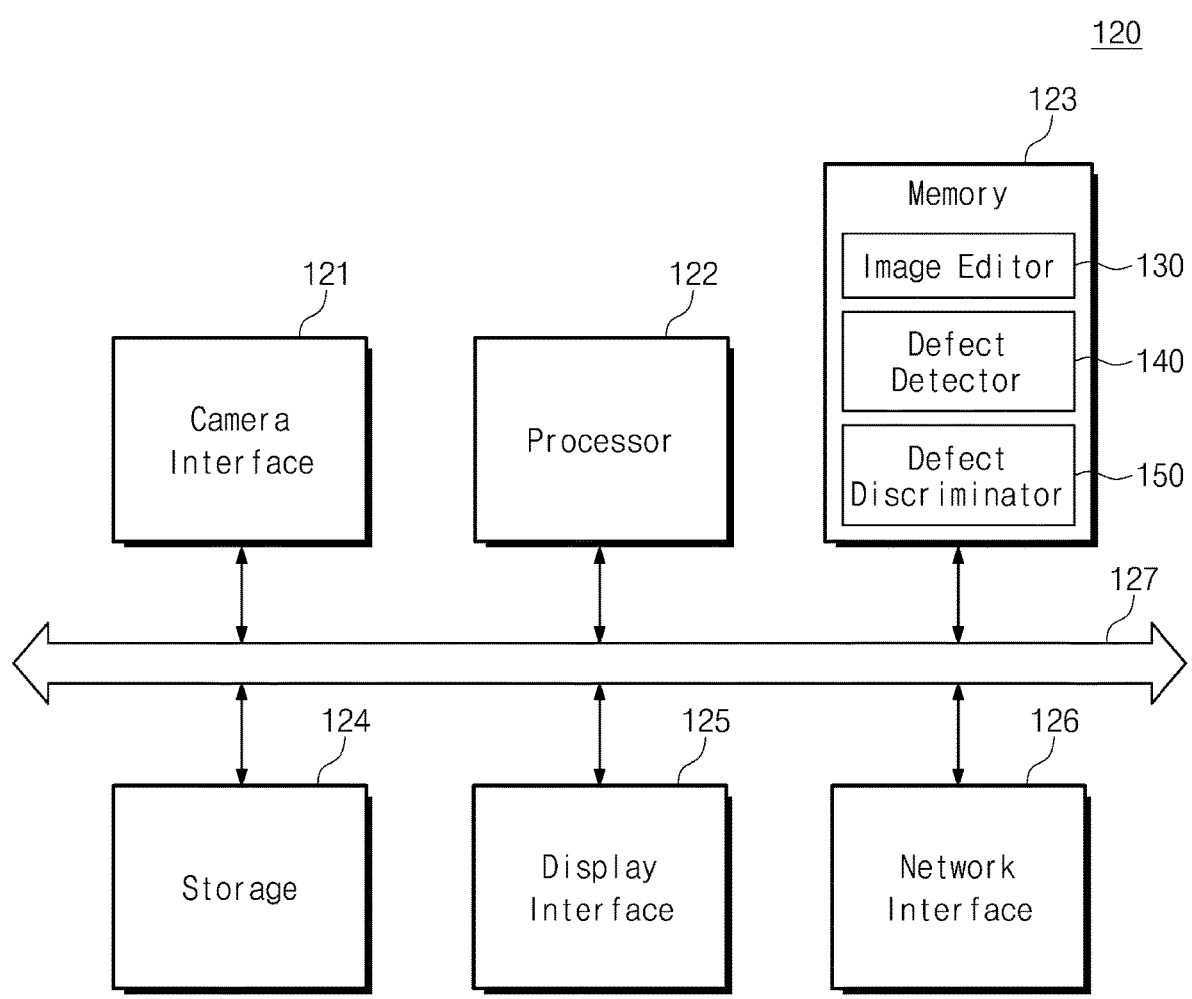
FIG. 2 is a block diagram showing a defect inspection device of FIG. 1.

FIG. 2 is a block diagram showing the defect inspection device 120 of FIG. 1. The defect inspection device 120 shown in FIG. 2 corresponds to the defect inspection device 120 of FIG. 1 and has a configuration that determines the defect of the specimen WD based on the target image obtained by the image sensor 110. However, the configuration of the defect inspection device 120 should not be limited thereto or thereby. Referring to FIG. 2, the defect inspection device 120 includes a camera interface 121, a processor 122, a memory 123, a storage 124, a display interface 125, a network interface 126, and a bus 127.

The camera interface 121 receives the target image from the image sensor 110 of FIG. 1. The defect inspection device 120 communicates with the image sensor 110 via the camera interface 121. For example, the camera interface 121 may be in serial communication with the image sensor 110. For example, a deserializer may be implemented in the camera interface 121, and a serializer may be implemented in the image sensor 110.

The processor 122 may perform a function as a central processing unit of the defect inspection device 120. The processor 122 may perform a control operation and a calculation operation, which are used (or required) to resize the target image, generate the inspection image, detect the defect area, and determine the defect of the specimen WD. For example, the camera interface 121 may receive the target image in response to the control of the processor 122. The image corresponding to the curved portion may be extracted from the target image and may be resized according to the control of the processor 122. The defect area may be detected and the defect of the specimen WD may be determined according to the control of the processor 122. The processor 122 may operate using a calculation space of the memory 123 and may read out files to operate an operating system and execution files of applications from the storage 124.

The memory 123 may store data and processor codes, which are processed (or to be processed) by the processor 122. For example, the memory 123 may store the target image provided from the camera interface 121, information used to generate the inspection image, information used to detect the defect area, and information used to determine the defect of the specimen WD. The memory 123 may be used as a main memory device of the defect inspection device 120. The memory 123 may include a dynamic RAM (DRAM), a static RAM (SRAM), a phase-change RAM (PRAM), a magnetic RAM (MRAM), a ferroelectric RAM (FeRAM), or a resistive RAM (RRAM), for example.

The memory 123 may include the image editor 130, the defect detector 140, and the defect discriminator 150. The image editor 130, the defect detector 140, and the defect discriminator 150 correspond to the image editor 130, the defect detector 140, and the defect discriminator 150 of FIG. 1, respectively. The image editor 130, the defect detector 140, and the defect discriminator 150 may be portions of the calculation space of the memory 123. For example, the image editor 130, the defect detector 140, and the defect discriminator 150 may be implemented by a firmware or software. For example, the firmware may be stored in the storage 124 and may be loaded to the memory 123 when the firmware is executed. The processor 122 may execute the firmware loaded to the memory 123.

The image editor 130 may be operated to extract and resize the image corresponding to the curved portion in the target image under the control of the processor 122, and thus the image editor 130 may generate the inspection image. The defect detector 140 may be operated to detect at least one defect area in the inspection image under the control of the processor 122. The defect discriminator 150 may be operated to determine whether the specimen WD is normal or abnormal based on the size of the defect area under the control of the processor 122.

In some embodiments, the image editor 130, the defect detector 140, and the defect discriminator 150 may be implemented as separate hardware components. For example, the image editor 130, the defect detector 140, and the defect discriminator 150 may be implemented by a dedicated logic circuit, such as a field-programmable gate array (FPGA) or an application-specific integrated circuit (ASIC).

The storage 124 may store data generated for long-term storage by the operating system or applications, files used to drive the operating system, or execution files of the applications. For example, the storage 124 may store files used to execute the image editor 130, the defect detector 140, and the defect discriminator 150. The storage 124 may be used as an auxiliary memory device of the defect inspection device 120. The storage 124 may include a flash memory, a phase-change RAM (PRAM), a magnetic RAM (MRAM), a ferroelectric RAM (FeRAM), or a resistive RAM (RRAM), for example.

The display interface 125 may communicate with the display device 160 of FIG. 1. As an example, the display interface 125 may be in serial communication with the display device 160. For example, a serializer may be implemented in the display interface 125, and a deserializer may be implemented in the display device 160.

The network interface 126 may communicate with external electronic devices. As an example, the network interface 126 may perform the communication based on at least one wireless communication method, such as a Long Term Evolution (LTE), a Code Division Multiple Access (CDMA), a WiFi, or a Radio Frequency Identification (RFID), or wired communication methods, such as a Universal Serial Bus (USB), a Serial AT attachment (SATA), a Serial Peripheral Interface (SPI), and/or an Inter-integrated Circuit (I²C).

The bus 127 may provide a communication path between components of the defect inspection device 120. The camera interface 121, the processor 122, the memory 123, the storage 124, the display interface 125, and the network interface 126 may exchange data with each other via the bus 127. The bus 127 may support various types of communication formats used in the defect inspection device 120.

Figure 3:
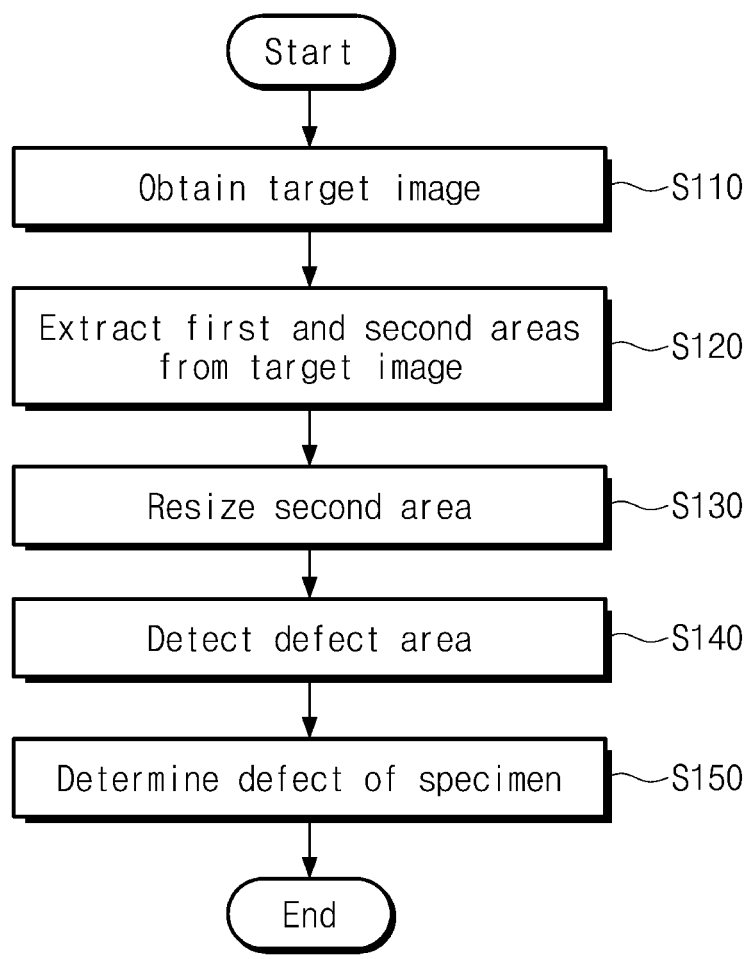
FIG. 3 is a flowchart showing a method of inspecting a specimen for a defect.

FIG. 3 is a flowchart showing a defect inspection method for the specimen. Each operation of FIG. 3 may be performed by the defect inspection system 100 of FIG. 1 or the defect inspection device 120 of FIG. 2, and may be executed by the processor 122 of FIG. 2. For the convenience of explanation, the defect inspection method of FIG. 3 is described with reference to the reference numerals of FIG. 1.

In operation S110, the image sensor 110 captures an image of the specimen WD (e.g., photographs the specimen WD) to obtain the target image. The target image is provided to the defect inspection device 120. The target image includes a first area corresponding to the flat portion of the specimen WD and a second area corresponding to the curved portion of the specimen WD.

In operation S120, the defect inspection device 120 extracts the first area and the second area from the target image. The first area and the second area may be extracted by the image editor 130. The image editor 130 may separate the first and second areas.

In operation S130, the defect inspection device 120 may resize the second area. The second area may be resized by the image editor 130. The image editor 130 may enlarge the second area by a resize ratio to generate a resized area (or a resize area). The resize ratio may be set based on an angle between a direction substantially orthogonal (or vertical) to the flat portion and a direction substantially orthogonal (or vertical) to a tangent plane (e.g., an arbitrary tangent plane) of the curved portion. The image editor 130 combines the first area with the resized area to generate the inspection image.

In operation S140, the defect inspection device 120 analyzes the inspection image to detect the at least one defect area. The defect area may be detected by the defect detector 140. For example, the defect detector 140 may detect the defect area using the connected-pixel detection manner.

In operation S150, the defect inspection device 120 may determine the defect of the specimen WD based on the size of the defect area. The defect of the specimen WD may be determined by the defect discriminator 150. For example, the defect discriminator 150 compares the size of the defect area with the reference range to determine whether the specimen WD is normal or abnormal.

Figure 4:
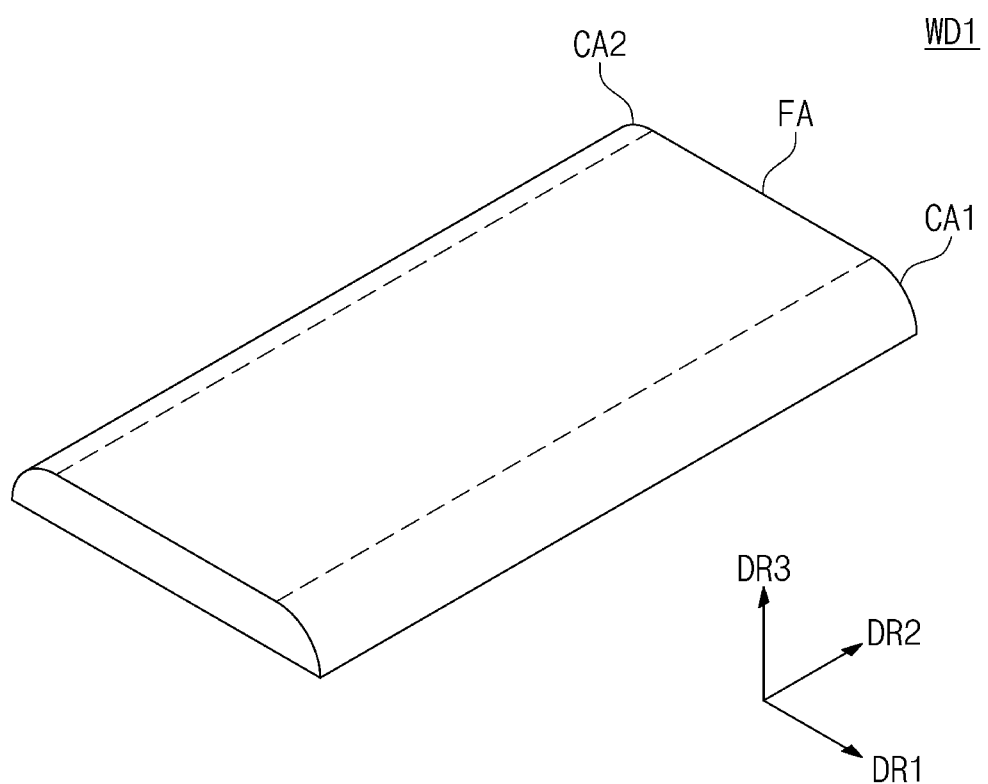
FIG. 4 is a perspective view showing a specimen to be inspected for a defect according to embodiments.

FIG. 4 is a perspective view showing a specimen WD1 to be inspected for a defect. The specimen WD1 corresponds to the specimen WD of FIG. 1. The specimen WD1 may be a cover member (e.g., a cover) to protect the display panel, for example, may be a cover glass. Referring to FIG. 4, the specimen WD1 includes a flat portion FA, a first curved portion CA1, and a second curved portion CA2.

Hereinafter, for the convenience of explanation, a first direction DR1, a second direction DR2, and a third direction DR3 are defined. The first direction DR1 corresponds to a direction in (or along) which the first curved portion CA1, the flat portion FA, and the second curved portion CA2 are arranged. The second direction DR2 may correspond to a direction in which each of the first curved portion CA1, the flat portion FA, and the second curved portion CA2 extends and may be substantially orthogonal (or vertical) to the first direction DR1. The third direction DR3 corresponds to a photographing direction of the image sensor 110, which is substantially orthogonal (or vertical) to the first and second directions DR1 and DR2.

A surface of the flat portion FA may be substantially parallel to a plane (or a surface) defined by the first and second directions DR1 and DR2 and may be substantially orthogonal (or vertical) to the third direction DR3. The first curved portion CA1 and the second curved portion CA2 extend in the first direction DR1 from the flat portion FA. Surfaces of the first and second curved portions CA1 and CA2, which are connected to the surface of the flat portion FA, have a curvature with respect to the second direction DR2. The first and second curved portions CA1 and CA2 may have the same curvature, however, they should not be limited thereto or thereby. The first and second curved portions CA1 and CA2 may be edge areas of the specimen WD1 (or peripheral areas of the specimen WD1).

The image sensor 110 of FIG. 1 captures an image of the specimen WD1 (e.g., photographs the specimen WD1) in the third direction DR3. When a defect exists in the flat portion FA, the defect is not distorted in the target image. When the defect exists in the first and second curved portions CA1 and CA2, the defect is distorted in the target image. For example, the defect appearing on the target image may be smaller than an actual size of the defect.

Figure 5:
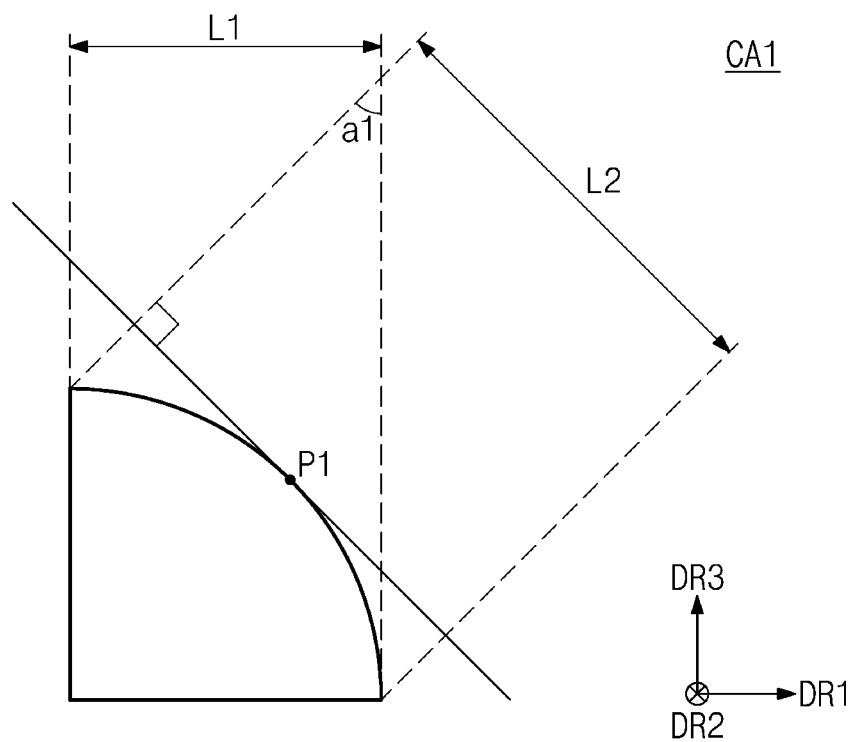
FIG. 5 is a cross-sectional view showing a curved portion of the specimen of FIG. 4.

FIG. 5 is a cross-sectional view showing the first curved portion CA1 of the specimen WD1 of FIG. 4. The first curved portion CA1 shown in FIG. 5 corresponds to the first curved portion CA1 of FIG. 4. The first curved portion CA1 is obtained when the first curved portion CA1 is viewed in the second direction DR2 of FIG. 4.

Referring to FIG. 5, the first curved portion CA1 has a first length L1 in the first direction DR1. The first curved portion CA1 is recognized (or perceived) as the first length L1 in the third direction. Because the image sensor 110 of FIG. 1 captures an image of the first curved portion CA1 (e.g., photographs the first curved portion CA1) in the third direction DR3, a curve of the curved portion is photographed (or captured) to have the first length L1. Accordingly, when the defect exists on the curve of the first curved portion CA1, the defect is photographed (or captured) at a length smaller than an actual length of the defect.

The first curved portion CA1 is recognized (or perceived) as a second length L2 when viewed in a direction (hereinafter, referred to as a "viewing direction") having a difference of a first angle a1 with respect to the third direction DR3. The second length L2 is greater (or longer) than the first length L1, and the defect on the curve of the first curved portion CA1 may appear larger in the viewing direction than that in the third direction DR3. Accordingly, when an additional processing is not given to the image of the first curved portion CA1, defects that are not found by the image capture (or photographing) only in the third direction DR3 may be found later.

The defect inspection device 120 of FIG. 1 may perform the resize operation to enlarge the first length L1 obtained by capturing an image of the first curved portion CA1 (e.g., photographing the first curved portion CA1) in the third direction DR3 to the second length L2 obtained by capturing an image of the first curved portion CA1 (e.g., photographing the first curved portion CA1) in the viewing direction in the target image. As such, the resize ratio that is a ratio of the second length L2 to the first length L1 is required. The resize ratio is determined based on the first angle a1. A cross point P1 corresponds to a point (e.g., an arbitrary point) on the curve of the first curved portion CA1 and is determined based on the viewing direction. A tangent line crossing the cross point P1 is substantially orthogonal (or vertical) to the viewing direction, and the first angle a1 is an angle between the viewing direction and the third direction DR3. Accordingly, the resize ratio may be calculated as a secant value sec(a1) of the first angle a1.

The resize ratio may be previously set for the defect inspection device 120. For example, the resize ratio may be determined by taking into account a defect occurrence pattern, a position at which the defect occurs a lot, a manufacturing process, and a defect detection efficiency. As an example, when it is determined that the defect detection efficiency is the highest when the cross point P1 is located in the middle of the curve of the first curved portion CA1, the resize ratio is about sec (45°), i.e., about the square root of 2.

Figure 6:
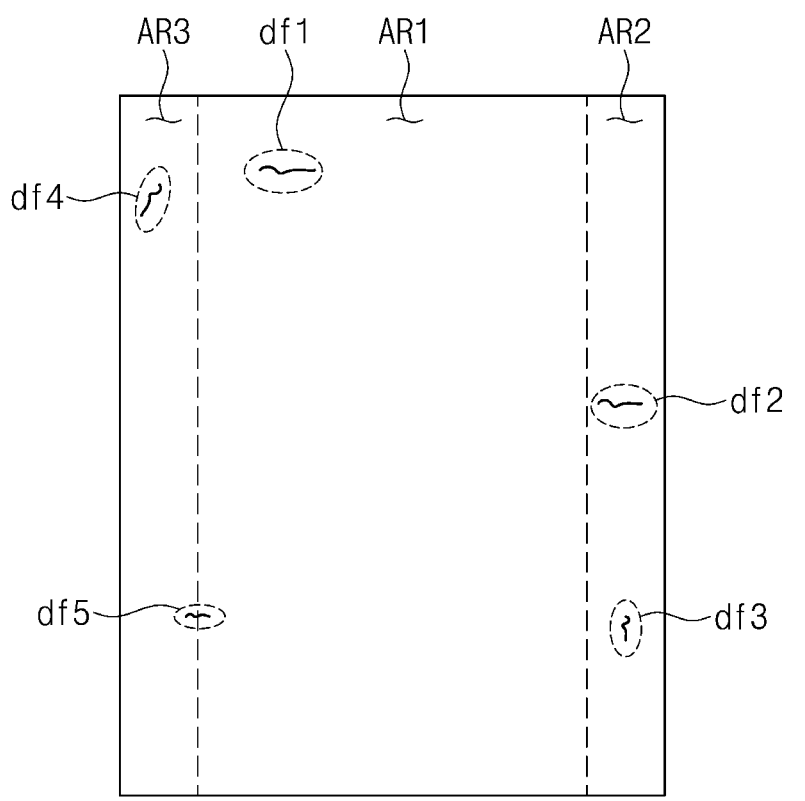
FIG. 6 is a plan view showing a target image obtained by capturing an image of the specimen of FIG. 4.

FIG. 6 is a plan view showing the target image obtained by capturing an image of the specimen WD1 of FIG. 4 (or by photographing the specimen WD1 of FIG. 4). Referring to FIG. 6, the target image IMG includes a first area AR1, a second area AR2, and a third area AR3. The first area AR1 is an image corresponding to the flat portion FA of FIG. 4. The second area AR2 is an image (curved area) corresponding to the first curved portion CA1 of FIG. 4. The third area AR3 is an image (curved area) corresponding to the second curved portion CA2 of FIG. 4.

In FIG. 6, for the convenience of explanation, the first direction DR1, the second direction DR2, and the third direction DR3 are defined. The target image IMG is information obtained based on the pixels arranged two-dimensionally in the image sensor 110, and the specimen WD1 exists in a three-dimensional space. Therefore, the first direction DR1, the second direction DR2, and the third direction DR3 of FIG. 6 should not be strictly construed in the same sense as the first direction DR1, the second direction DR2, and the third direction DR3 of FIG. 4. However, because coordinates of the target image IMG correspond to coordinates of the specimen WD1, it will be apparent that the first direction DR1, the second direction DR2, and the third direction DR3 of FIG. 6 correspond to the first direction DR1, the second direction DR2, and the third direction DR3 of FIG. 4, respectively.

The second area AR2 and the third area AR3 respectively correspond to the first curved portion CA1 and the second curved portion CA2, and thus the second and third areas AR2 and AR3 may be (or have) distorted images. Referring to FIG. 4, the first and second curved portions CA1 and CA2 have curvatures with respect to the second direction DR2. Accordingly, each of the second area AR2 and the third area AR3 may be distorted in the first direction DR1, but may not be distorted in the second direction DR2.

In the present example embodiment, it is assumed that a first defect area df1, a second defect area df2, a third defect area df3, a fourth defect area df4, and a fifth defect area df5 exist in the target image IMG as a result of forming defects in the specimen WD1. Because the first defect area df1 is formed in the first area AR1, the first defect area df1 may be an image that is not distorted. Because the second defect area df2 is formed in the second area AR2 and substantially extends in the first direction DR1, the second defect area df2 may be an image that is distorted to be smaller than an actual length of the defect. The third defect area df3 is formed in the second area AR2 and substantially extends in the second direction DR2, and thus the third defect area df3 may be an almost undistorted image. The fourth defect area df4 is formed in the third area AR3 and extends in a direction different from the first and second directions DR1 and DR2, and as a result, the fourth defect area df4 may be an image distorted in the first direction DR1 and not distorted in the second direction DR2. Because the fifth defect area df5 is formed over the first area AR1 and the third area AR3 and substantially extends in the first direction DR1, the fifth defect area df5 may be an image that is distorted only in an area corresponding to the third area AR3.

Figure 7:
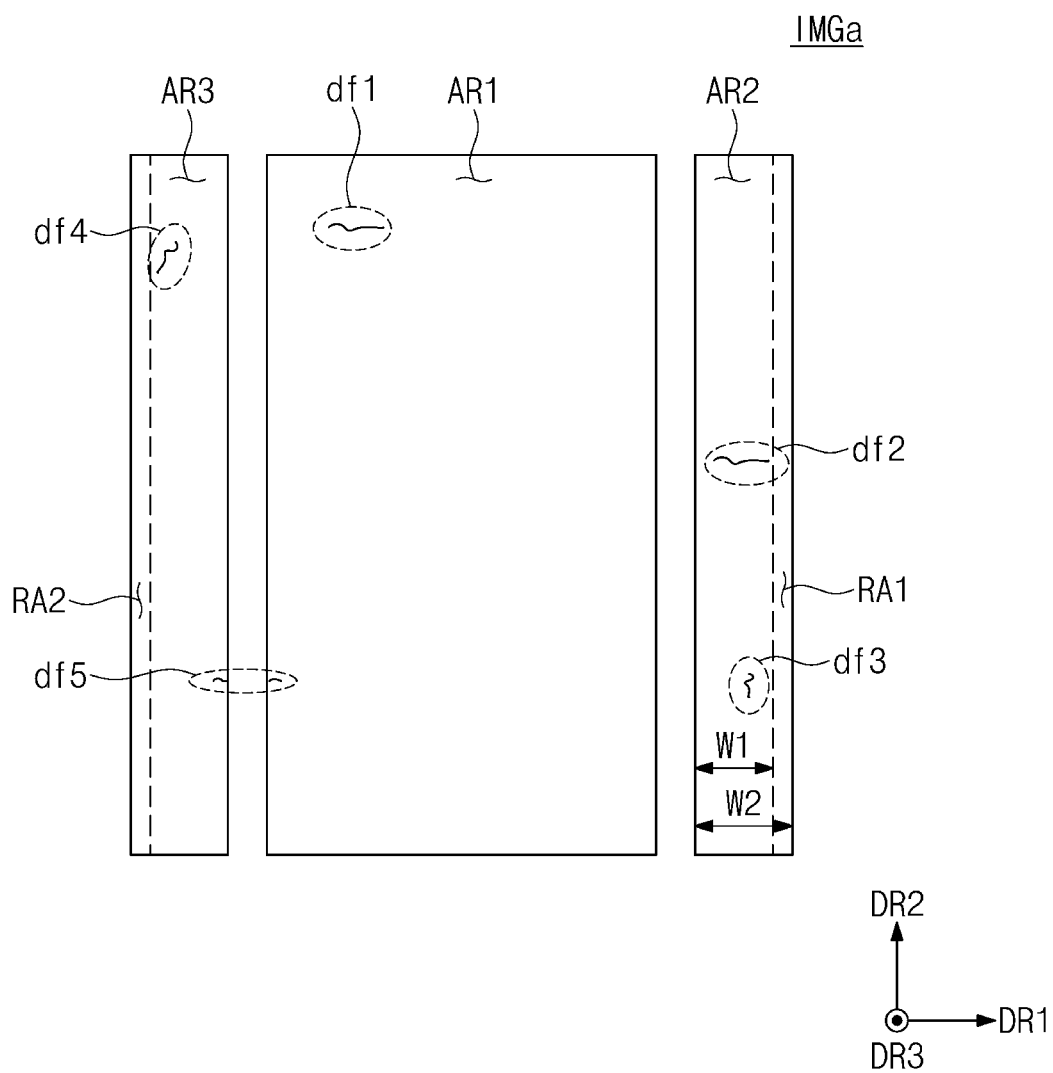
FIG. 7 is a plan view showing an inspection image generated based on the target image of FIG. 6.

FIG. 7 is a plan view showing an inspection image generated based on the target image of FIG. 6. Referring to FIG. 7, an inspection image IMGa includes the first area AR1, a first resized area RA1, and a second resized area RA2. As described above, the inspection image IMGa is an image obtained by combining the first area AR1, the first resized area RA1, and the second resized area RA2, however, for the convenience of explanation, the first area AR1, the first resized area RA1, and the second resized area RA2 are shown after being separated from each other.

First, the first area AR1, the second area AR2, and the third areas AR3 may be extracted from the target image IMG of FIG. 6 and separated from each other. Then, the second area AR2 and the third area AR3 may be enlarged in the first direction DR1 by the resize ratio. As a result, the first resized area RA1 and the second resized area RA2 are generated. For example, the second area AR2 has a first width W1 in the first direction DR1, and the first resized area RA1 has a second width W2 in the first direction DR1. The second width W2 is larger than the first width W1. The resize ratio may be a ratio of the second width W2 to the first width W1.

The first defect area df1 may be maintained the same as that of the target image IMG of FIG. 6. The second defect area df2 is enlarged in the first direction DR1 by enlarging the second area AR2. The third defect area df3 extends in the second direction DR2, and thus the size of the third defect area df3 is hardly changed even though the second area AR2 is enlarged. The fourth defect area df4 is enlarged in the first direction DR1 as the third area AR3 is enlarged, but is not enlarged in the second direction DR2. A portion of the fifth defect area df5 that is formed in the first area AR1 is not enlarged, and a portion of the fifth defect area df5 that is formed in the third area AR3 is enlarged.

The inspection image IMGa is used to detect the defect of the specimen WD1. The first defect area df1, the second defect area df2, the third defect area df3, the fourth defect area df4, and the fifth defect area df5 are detected from the inspection image IMGa, and each of the first defect area df1, the second defect area df2, the third defect area df3, the fourth defect area df4, and the fifth defect area df5 may be compared with the reference range. The first defect area df1, the second defect area df2, the third defect area df3, the fourth defect area df4, and the fifth defect area df5 compared with the reference range are images on which the resize operation is performed as described above.

Figure 8:
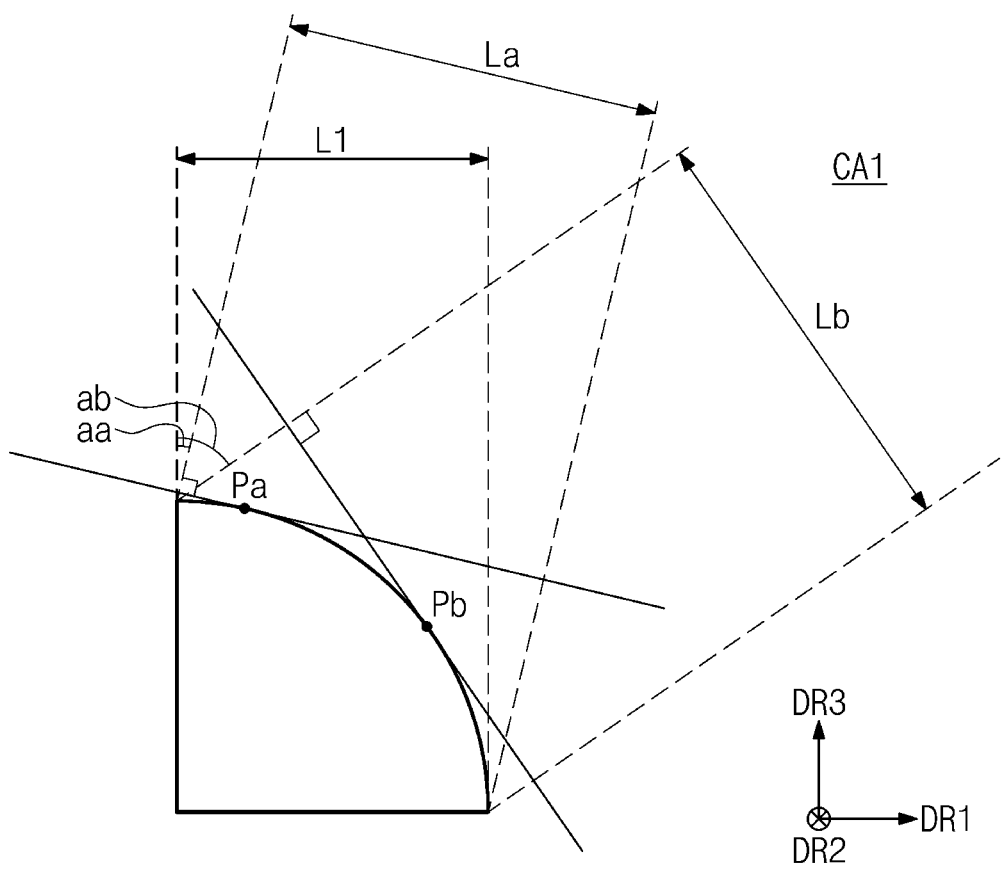
FIG. 8 is a cross-sectional view showing a curved portion of the specimen of FIG. 4.

FIG. 8 is a cross-sectional view showing the first curved portion CA1 of FIG. 4. The curved portion shown in FIG. 8 corresponds to the first curved portion CA1 of FIG. 4 and FIG. 5. Referring to FIG. 8, the first curved portion CA1 has the first length L1 in the first direction DR1. The first curved portion CA1 is recognized as having the first length L1 when viewed in the third direction DR3.

According to embodiments, a plurality of resize ratios for the defect inspection of the specimen WD1 may be provided. For example, a first resize ratio may be determined based on a first viewing direction having a difference of a first angle aa with respect to the third direction DR3 and may be a secant value sec(aa) of the first angle. For example, a second resize ratio may be determined based on a second viewing direction having a difference of a second angle ab with respect to the third direction DR3 and may be a secant value sec(ab) of the second angle. The first viewing direction may be a direction substantially orthogonal (or vertical) to a tangent line of a first point Pa, and the second viewing direction may be a direction substantially orthogonal (or vertical) to a tangent line of a second point Pb. The first curved portion CA1 may have a first viewing length La in a direction substantially orthogonal (or vertical) to the first viewing direction and may have a second viewing length Lb in a direction substantially orthogonal (or vertical) to the second viewing direction.

Figure 9:
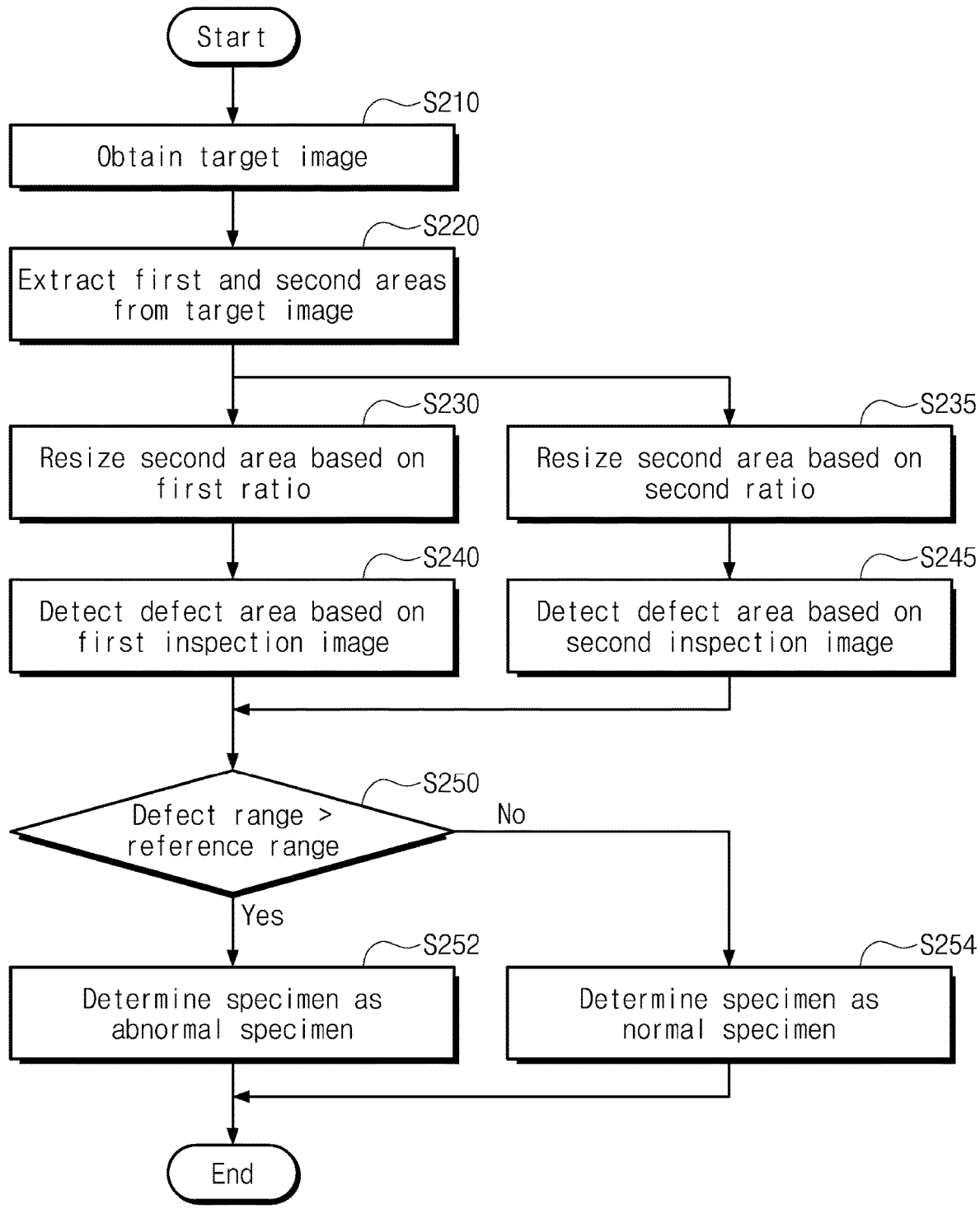
FIG. 9 is a flowchart showing a method of inspecting the specimen of FIG. 8 for defects.

FIG. 9 is a flowchart showing a defect inspection method for the specimen WD1 of FIG. 4 and FIG. 8. Each operation of FIG. 9 is performed by the defect inspection system 100 of FIG. 1 or the defect inspection device 120 of FIG. 2. Referring to FIG. 9, the defect inspection method that detects the defect of the specimen using the resize ratios is described. For the convenience of explanation, the defect inspection method shown in FIG. 9 is described with reference to reference numerals of FIG. 8.

In operation S210, the target image is obtained, and this corresponds to operation S110 of FIG. 3. In operation S220, the first area corresponding to the flat portion and the second area corresponding to the curved portion are extracted from the target image, and this corresponds to operation S120 of FIG. 3.

In operation S230, the second area is resized based on the first ratio (the first resize ratio of FIG. 8). The second area resized by the first ratio is combined with the first area, and the first inspection image is generated. In addition, in operation S235, the second area is resized based on the second ratio (the second resize ratio of FIG. 8). The first ratio is different from the second ratio. The second area resized by the second ratio is combined with the first area, and the second inspection image is generated.

In operation S240, the defect area is detected from the first inspection image. In addition, in operation S245, the defect area is detected from the second inspection image. The method of detecting the defect area corresponds to the method of operation S140 of FIG. 3.

In operation S250, the detection areas detected in operations S240 and 245 are compared with the reference range. When a defect range is larger than the reference range (or equal to or larger than the reference range), the specimen is determined to be abnormal in operation S252. When at least one of the size of the defect area detected from the first inspection image and the size of the defect area detected from the second inspection image is larger than the reference range, the specimen is determined to be abnormal.

When the defect range is equal to or smaller than the reference range (or smaller than the reference range), the specimen is determined to be normal in operation S254. When the size of the defect area detected from the first inspection image and the size of the defect area detected from the second inspection image are equal to or smaller than the reference range, the specimen is determined to be normal.

The first and second resize ratios, which are different from each other, are applied to the target image in parallel, and thus an image correction reliability of the curved portion may be improved. As a result, the defect detection reliability of the specimen may be improved.

Figure 10:
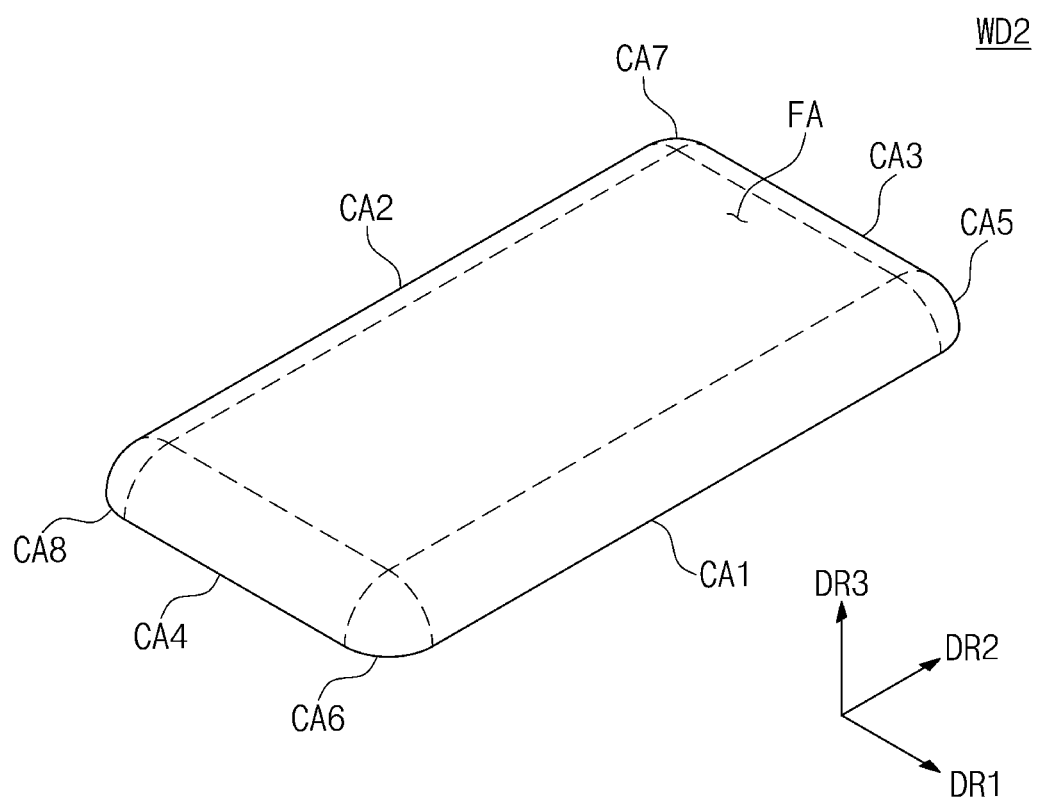
FIG. 10 is a perspective view showing a specimen to be inspected for a defect according to embodiments.

FIG. 10 is a perspective view showing a specimen WD2 to be inspected for a defect. The specimen WD2 corresponds to the specimen WD of FIG. 1. The specimen WD2 may be a cover member (e.g., a cover) to protect the display panel and, for example, may be a cover glass. Referring to FIG. 10, the specimen WD2 includes a flat portion FA and a first curved portion CA1, a second curved portion CA2, a third curved portion CA3, a fourth curved portion CA4, a fifth curved portion CA5, a sixth curved portion CA6, a seventh curved portion CA7, and an eighth curved portion CA8.

The specimen WD2 may include periphery (or edge) areas, each of which has a curvature, that are disposed at four sides adjacent to the flat portion FA. The first and second curved portions CA1 and CA2 extend in the first direction DR1 from the flat portion FA and have a curvature with reference to the second direction DR2. The third and fourth curved portions CA3 and CA4 extend in the second direction DR2 from the flat portion FA and have a curvature with reference to the first direction DR1.

The fifth curved portion CA5 extends in the second direction DR2 from the first curved portion CA1 and extends in the first direction DR1 from the third curved portion CA3. The sixth curved portion CA6 extends in the second direction DR2 from the first curved portion CA1 and extends in the first direction DR1 from the fourth curved portion CA4. The seventh curved portion CA7 extends in the second direction DR2 from the second curved portion CA2 and extends in the first direction DR1 from the third curved portion CA3. The eighth curved portion CA8 extends in the second direction DR2 from the second curved portion CA2 and extends in the first direction DR1 from the fourth curved portion CA4. The fifth curved portion CA5, the sixth curved portion CA6, the seventh curved portion CA7, and the eighth curved portion CA8 have curvatures with respect to a direction crossing the first and second directions DR1 and DR2 and substantially orthogonal (or vertical) to the third direction DR3.

Figure 11:
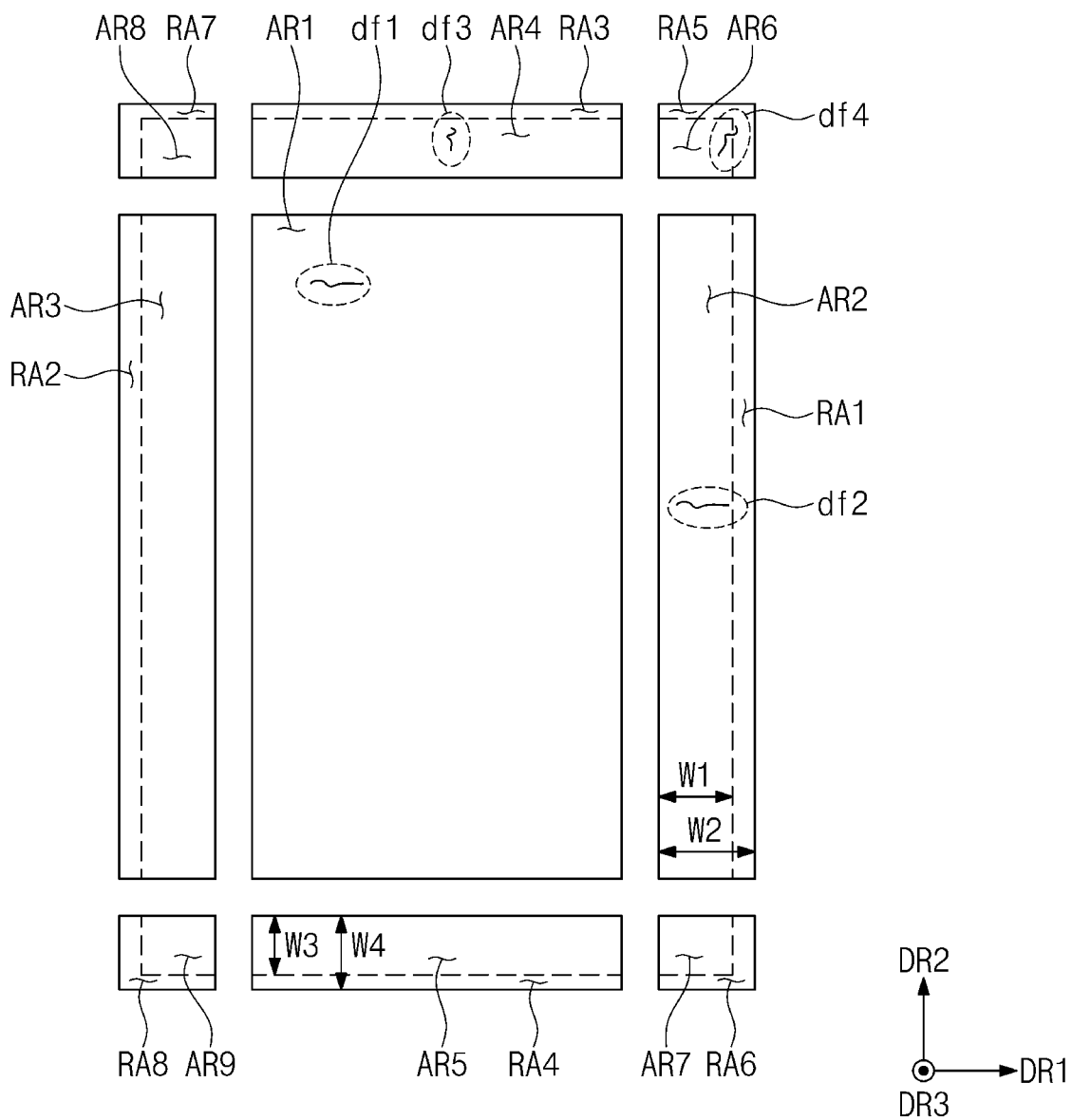
FIG. 11 is a plan view showing an inspection image generated based on a target image of the specimen of FIG. 10.

FIG. 11 is a plan view showing an inspection image IMGb generated based on a target image of the specimen of FIG. 10. The target image obtained by photographing the specimen WD2 of FIG. 10 includes a first area AR1, a second area AR2, a third area AR3, a fourth area AR4, a fifth area AR5, a sixth area AR6, a seventh area AR7, an eighth area AR8, and a ninth area AR9. The first area AR1 is an image corresponding to the flat portion FA of the specimen WD2 of FIG. 10. The second area AR2, the third area AR3, the fourth area AR4, the fifth area AR5, the sixth area AR6, the seventh area AR7, the eighth area AR8, and the ninth area AR9 are images respectively corresponding to the first curved portion CA1, the second curved portion CA2, the third curved portion CA3, the fourth curved portion CA4, the fifth curved portion CA5, the sixth curved portion CA6, the seventh curved portion CA7, and the eighth curved portion CA8 of FIG. 10.

Referring to FIG. 11, the inspection image IMGb is generated by resizing the second area AR2, the third area AR3, the fourth area AR4, the fifth area AR5, the sixth area AR6, the seventh area AR7, the eighth area AR8, and the ninth area AR9 of the target image. The inspection image IMGb includes the first area AR1 and a first resized area RA1, a second resized area RA2, a third resized area RA3, a fourth resized area RA4, a fifth resized area RA5, a sixth resized area RA6, a seventh resized area RA7, and an eighth resized area RA8. For the resize operation, the first area AR1, the second area AR2, the third area AR3, the fourth area AR4, the fifth area AR5, the sixth area AR6, the seventh area AR7, the eighth area AR8, and the ninth area AR9 may be separated from each other. Then, the second area AR2, the third area AR3, the fourth area AR4, the fifth area AR5, the sixth area AR6, the seventh area AR7, the eighth area AR8, and the ninth area AR9 may be resized and coupled to the first area AR1 to generate the inspection image IMGb.

The second area AR2 and the third area AR3 may be enlarged in the first direction DR1 by the first resize ratio. As a result, the first resized area RA1 and the second resized area RA2 are generated. For example, the second area AR2 has a first width W1 in the first direction DR1, and the first resized area RA1 has a second width W2 in the first direction DR1. The first resize ratio may be a ratio of the second width W2 to the first width W1.

The fourth area AR4 and the fifth area AR5 may be enlarged in the second direction DR2 by the second resize ratio. As a result, the third resized area RA3 and the fourth resized area RA4 are generated. For example, the fifth area AR5 has a third width W3 in the second direction DR2, and the fourth resized area RA4 has a fourth width W4 in the second direction DR2. The second resize ratio may be a ratio of the fourth width W4 to the third width W3.

The sixth area AR6, the seventh area AR7, the eighth area AR8, and the ninth area AR9 may be enlarged in the first direction DR1 by the first resize ratio and may be enlarged in the second direction DR2 by the second resize ratio. As a result, the fifth resized area RA5, the sixth resized area RA6, the seventh resized area RA7, and the eighth resized area RA8 are generated.

It is assumed that a first defect area df1, a second defect area df2, a third defect area df3, and a fourth defect area df4 exist in the target image as a result of forming defects in the specimen WD2. Because the first defect area df1 is formed in the first area AR1 corresponding to the flat portion FA, the first defect area df1 is not enlarged even though the resize operation is performed. The second defect area df2 is formed in the second area AR2, and thus the second defect area df2 is enlarged in the first direction DR1 by the first resize ratio.

The third defect area df3 is formed in the fourth area AR4, and as a result, the third defect area df3 is enlarged in the second direction DR2 by the second resize ratio. Because the fourth defect area df4 is formed in the sixth area AR6, the fourth defect area df4 is enlarged in the first direction DR1 by the first resize ratio and enlarged in the second direction DR2 by the second resize ratio.

The first defect area df1, the second defect area df2, the third defect area df3, and the fourth defect area df4 may be detected from the inspection image IMGb, and each of the first defect area df1, the second defect area df2, the third defect area df3, and the fourth defect area df4 may be compared with the reference range. The first defect area df1, the second defect area df2, the third defect area df3, and the fourth defect area df4 compared with the reference range are images on which the resize operation is performed as described above.

Figure 12:
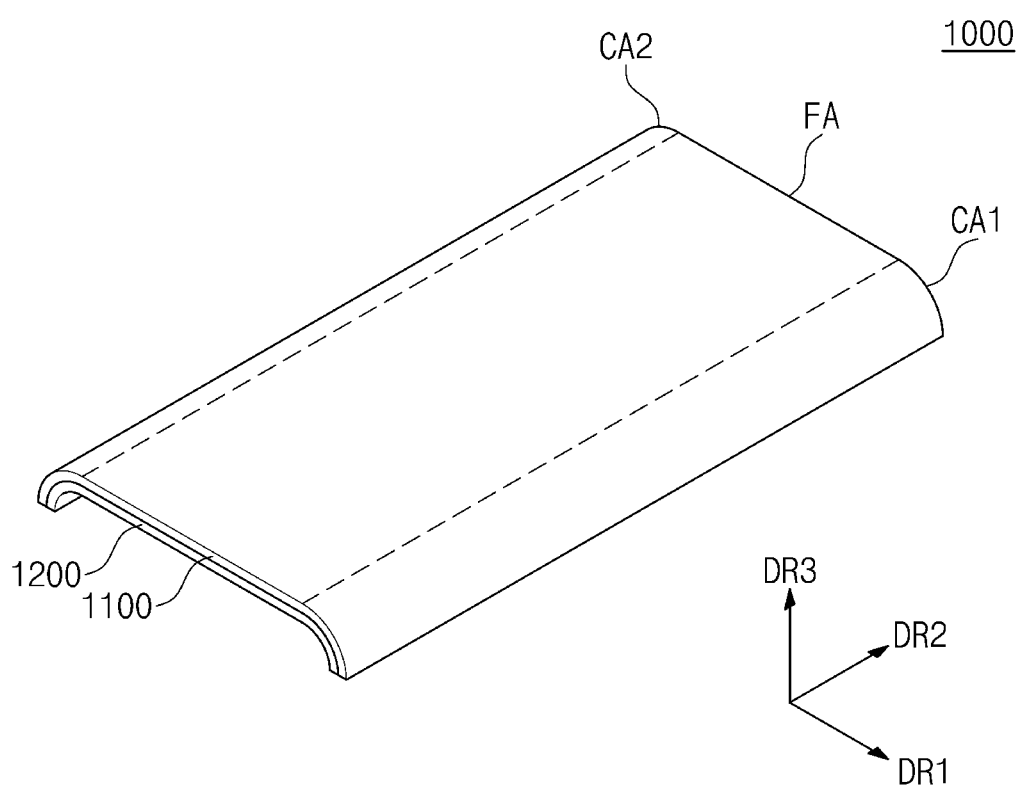
FIG. 12 is a perspective view showing a display device to which a specimen is applied.

FIG. 12 is a perspective view showing a display device 1000 to which a specimen is applied. Referring to FIG. 12, the display device 1000 includes a cover (e.g., a cover glass) 1100 and a display panel 1200. The cover glass 1100 corresponds to the specimen WD/WD1/WD2 described with reference to FIGS. 1-11.

The cover glass 1100 includes the flat portion FA, the first curved portion CA1, and the second curved portion CA2. The first curved portion CA1 and the second curved portion CA2 may extend in the first direction DR1 from the flat portion FA. Each of the flat portion FA, the first curved portion CA1, and the second curved portion CA2 may extend in the second direction DR2. The cover glass 1100 is disposed on the display panel 1200 in the third direction DR3. The cover glass 1100 protects the display panel 1200 from external factors, such as a touch operation, a sharp object, moisture, and dust.

The display panel 1200 is configured to display an image. The display panel 1200 may be a curved display panel that is maintained in a curved state corresponding to the cover glass 1100, however, it should not be limited thereto or thereby. For example, the display panel 1200 may display the image through an area corresponding to the flat portion FA, and bezel areas may be defined in areas corresponding to the first and second curved portions CA1 and CA2.

The display panel 1200 may be one of various display panels, such as a liquid crystal display panel, an organic light emitting display panel, an electrophoretic display panel, and an electrowetting display panel.

Although example embodiments of the present disclosure have been described, it is to be understood that the present disclosure should not be limited to these example embodiments but various changes and modifications can be made by one of ordinary skill in the art within the spirit and scope of the present disclosure as hereinafter claimed.

Therefore, the disclosed subject matter should not be limited to any single embodiment described herein, and the scope of the present inventive concept shall be determined according to the appended claims and their equivalents.

What is claimed is:

1. A defect inspection system for a specimen, the system comprising:

an image sensor configured to capture a target image of the specimen, the specimen comprising a flat portion and a curved portion extending from the flat portion along a first direction and having a curvature, the target image comprising a first area corresponding to the flat portion of the specimen and a second area corresponding to the curved portion of the specimen; and a defect inspection device configured to determine a defect of the specimen based on the target image, the defect inspection device comprising an image editor configured to detect the second area based on a difference in at least one of brightness, color, and saturation between the first area and the second area in the target image, and to enlarge a width of the second area along the first direction by a resize ratio, wherein a shape of the curved portion is distorted in the target image based on a depth difference between the flat portion and the curved portion, and the width of the second area is enlarged to enhance a distorted portion of the curved portion in the target image.

2. The defect inspection system of claim 1, wherein the image editor is configured to separate the first area from the second area, to generate a resized area by enlarging the width of the second area, and to combine the first area with the resized area to generate an inspection image.

3. The defect inspection system of claim 2, wherein the defect inspection device further comprises:
a defect detector configured to detect a defect area from the inspection image; and
a defect discriminator configured to compare a size of the defect area with a reference range to determine whether the specimen is normal.

4. The defect inspection system of claim 3, wherein the defect detector is configured to divide the inspection image into a plurality of areas based on a difference in information between pixels adjacent to each other in the inspection image and to select the defect area from the plurality of areas.

5. The defect inspection system of claim 3, wherein the defect discriminator is configured to determine that the specimen is abnormal when the size of the defect area is larger than the reference range.

6. The defect inspection system of claim 1, wherein the resize ratio is based on an angle between a third direction substantially orthogonal to the flat portion and a fourth direction substantially orthogonal to a tangent plane of the curved portion.

7. The defect inspection system of claim 6, wherein the resize ratio is a secant value of the angle.

8. The defect inspection system of claim 1, wherein the resize ratio comprises:
a first ratio based on a first angle between a third direction substantially orthogonal to the flat portion and a fourth direction substantially orthogonal to a first tangent plane at a first point of the curved portion; and
a second ratio based on a second angle between the third direction and a fifth direction substantially orthogonal to a second tangent plane at a second point of the curved portion, and
wherein the image editor is configured to enlarge the width of the second area by the first ratio to generate a first inspection image and to enlarge the width of the second area by the second ratio to generate a second inspection image.

9. The defect inspection system of claim 8, wherein the defect inspection device further comprises:
a defect detector configured to detect a first defect area from the first inspection image and a second defect area from the second inspection image; and
a defect discriminator configured to determine that the specimen is abnormal when a size of the first defect area is larger than a reference range or when a size of the second defect area is larger than the reference range.

10. The defect inspection system of claim 1, wherein the curved portion comprises:
a first portion extending in the first direction from the flat portion; and
a second portion extending in a second direction from the flat portion, the second direction crossing the first direction,
wherein the second area comprises:
a first curved area corresponding to the first portion; and
a second curved area corresponding to the second portion, and
wherein the image editor is configured to enlarge a width of the first curved area corresponding to the first direction and to enlarge a width of the second curved area corresponding to the second direction.

11. The defect inspection system of claim 10,
wherein the curved portion further comprises a third portion extending in the second direction from the first portion and extending in the first direction from the second portion,
wherein the second area further comprises a third curved area corresponding to the third portion, and
wherein the image editor is configured to enlarge a width of the third curved area corresponding to the first direction and a width of the third curved area corresponding to the second direction.

12. A method of inspecting a specimen for a defect, the method comprising:
capturing a target image of the specimen, the specimen comprising a flat portion and a curved portion extending in a first direction from the flat portion and having a curvature with respect to a second direction crossing the first direction;
extracting a first area corresponding to the flat portion and a second area corresponding to the curved portion from the target image by detecting the second area based on a difference in at least one of brightness, color, and saturation between the first area and the second area in the target image;
enlarging a width of the second area corresponding to the first direction to generate an inspection image; and
determining whether the specimen is normal based on the inspection image,
wherein a shape of the curved portion is distorted in the target image based on a depth difference between the flat portion and the curved portion, and the width of the second area is enlarged to enhance a distorted portion of the curved portion in the target image.

13. A method of inspecting a specimen for a defect, the method comprising:
capturing a target image of the specimen, the specimen comprising a flat portion and a curved portion extending in a first direction from the flat portion and having a curvature with respect to a second direction crossing the first direction;
extracting a first area corresponding to the flat portion and a second area corresponding to the curved portion from the target image;
enlarging a width of the second area corresponding to the first direction to generate an inspection image; and
determining whether the specimen is normal based on the inspection image,
wherein the generating of the inspection image comprises:
enlarging the width of the second area by a resize ratio to generate a resized area; and
combining the first area with the resized area.

14. The method of claim 13, wherein the resize ratio is a secant value of an angle between a third direction substantially orthogonal to the flat portion and a fourth direction substantially orthogonal to a tangent plane of the curved portion.

15. The method of claim 12, wherein the determining whether the specimen is normal comprises:
    detecting a defect area from the inspection image; and
    comparing a size of the defect area with a reference range to determine a defect of the specimen.

16. The method of claim 15, wherein, when at least a portion of the defect area exists in the second area, the defect area in the second area is enlarged in the first direction in the generating of the inspection image.

17. The method of claim 12, wherein the generating of the inspection image comprises:
    enlarging the width of the second area by a first ratio to generate a first resized area;
    combining the first area with the first resized area to generate a first inspection image;
    enlarging the width of the second area by a second ratio different from the first ratio to generate a second resized area; and
    combining the first area with the second resized area to generate a second inspection image.

18. The method of claim 17, wherein the determining whether the specimen is normal comprises:
    detecting a first defect area from the first inspection image;
    detecting a second defect area from the second inspection image; and
    determining that the specimen is abnormal when a size of the first defect area is larger than a reference range or when a size of the second defect area is larger than the reference range.

19. The method of claim 17, wherein the determining whether the specimen is normal comprises:
    detecting a first defect area from the first inspection image;
    detecting a second defect area from the second inspection image; and
    determining that the specimen is normal when a size of the first defect area is smaller than a reference range and a size of the second defect area is smaller than the reference range.

20. The method of claim 12, wherein the specimen comprises a cover glass on a display panel.

* * * * *